(12) United States Patent
Wu et al.

(10) Patent No.: US 8,611,229 B2
(45) Date of Patent: Dec. 17, 2013

(54) RETRANSMISSION METHOD, BASE STATION, AND USER DEVICE IN MULTICAST SYSTEM

(75) Inventors: Qiang Wu, Beijing (CN); Ming Xu, Beijing (CN); Zheng Zhao, Beijing (CN); Atsushi Sumasu, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/863,577

(22) PCT Filed: Jan. 21, 2009

(86) PCT No.: PCT/JP2009/000214
§ 371 (c)(1),
(2), (4) Date: Aug. 2, 2010

(87) PCT Pub. No.: WO2009/093450
PCT Pub. Date: Jul. 30, 2009

(65) Prior Publication Data
US 2010/0290383 A1    Nov. 18, 2010

(30) Foreign Application Priority Data
Jan. 21, 2008    (CN) .......................... 2008 1 0004614

(51) Int. Cl.
*E01H 6/00*    (2006.01)
(52) U.S. Cl.
USPC ............. 370/242; 370/473; 370/252; 714/52; 714/748; 714/749
(58) Field of Classification Search
USPC ......... 370/312, 230, 473, 242, 243, 244, 245, 370/252; 714/52, 748, 749
See application file for complete search history.

(56) References Cited

U.S. PATENT DOCUMENTS 6,970,436 B2 *  11/2005  Park .......................... 370/310.1
2009/0144597 A1 *  6/2009  Xue et al. ...................... 714/748

FOREIGN PATENT DOCUMENTS

WO    200/066421    6/2008

OTHER PUBLICATIONS

European Search Report dated Jul. 5, 2012.
P. Larsson, et al., "Multi-User ARQ," IEEE Vehicular Technology Conference, vol. 4, No. 63, XP003001812, May 7, 2006, pp. 2052-2057.
C. Gkantsidis, et al., "Network Coding for Large Scale Content Distribution," 24th Annual Joint Conference of the IEE Computer and Communications Societies, vol. 4, XP010829261, Mar. 13-17, 2005, pp. 2235-2245.
International Search Report dated Apr. 14, 2009.
S. Yong, et al., "XOR Retransmission in Multicast Error Recovery," IEEE International Conference, Sep. 2009, pp. 336-340, p. 6, Line 10.
3GPP TSG-GERAN Meeting #20, "XOR Retransmission for MBMS," QUALCOMM Europe, G2-041399, Jun. 2004, pp. 1-5.

* cited by examiner

*Primary Examiner* — Dady Chery
(74) *Attorney, Agent, or Firm* — Dickinson Wright PLLC

(57) ABSTRACT

Disclosed are a retransmission method, a base station, and a user device in a multicast system. In order to reduce uplink signaling resource, a new MNI (Multiple NACK Indicator) message is added to an uplink common feedback channel in an existing E-MBMS system. The MNI message enables decision of an XOR retransmission group which satisfies the XOR retransmission condition. As compared to a conventional XOR retransmission, the number of uplink signalings does not depend on the number of receivers. That is, when a plenty of receptions are present, it is possible to significantly reduce uplink signalings.

15 Claims, 15 Drawing Sheets

| | CONVENTIONAL XOR RETRANSMISSION | PRESENT INVENTION |
|---|---|---|
| UPLINK FEEDBACK SIGNALING | 1 × 12 × 50 = 600 | 2 × 12 = 24 |
| RETRANSMISSION DATA PACKET | 3 | 3 |

FIG.15

RETRANSMISSION METHOD, BASE STATION, AND USER DEVICE IN MULTICAST SYSTEM

TECHNICAL FIELD

The present invention relates to a data retransmission method in a radio communication system. More particularly, the present invention relates to a retransmission method, a base station and a user apparatus in a multicast system that allow the amount of retransmission data and uplink signaling overhead to be reduced.

BACKGROUND ART

An XOR (exclusive or) retransmission method in a multicast system is currently studied whereby a transmitter retransmits retransmission data obtained by performing XOR calculation for data that is requested for retransmission from receivers (e.g. see Non-Patent Document 1). This XOR retransmission method allows the amount of retransmission data to be reduced. Now, explanation will be given in detail using a schematic diagram of XOR retransmission shown in FIG. 1. First, a transmitter transmits data packets $P_1$, $P_2$ and $P_3$ to receiver 1, receiver 2 and receiver 3 at the same time. In FIG. 1, receiver 1 cannot receive data packet $P_1$ correctly, receiver 2 cannot receive data packet $P_2$ correctly and receiver 3 cannot receive data packet $P_3$ correctly. Then, receiver 1 transmits a retransmission request (NACK: negative acknowledgment) for data packet $P_1$ to the transmitter, receiver 2 transmits a retransmission request (NACK) for data packet $P_2$ to the transmitter and receiver 3 transmits a retransmission request (NACK) for data packet $P_3$ to the transmitter. Upon receiving these retransmission requests, the transmitter transmits retransmission data packet C according to following equation 1.

[1]

$$C = P_1 \oplus P_2 \oplus P_3 \quad \text{(Equation 1)}$$

In equation 1, "$\oplus$" represents the XOR calculation of bits. Further, the transmitter reports to each receiver that retransmission data packet C is obtained from XOR calculation of data packets $P_1$, $P_2$ and $P_3$. Accordingly, data packets $P_2$ and $P_3$ are already known, so that receiver 1 restores data packet $P_1$ by the XOR calculation represented in equation 2 upon receiving data packet C. Likewise, receiver 2 restores data packet $P_2$ by the XOR calculation represented in equation 3 and receiver 3 restores data packet $P_3$ by the XOR calculation represented in equation 4.

[2]

$$P_1 = C \oplus P_2 \oplus P_3 \quad \text{(Equation 2)}$$

[3]

$$P_2 = C \oplus P_1 \oplus P_3 \quad \text{(Equation 3)}$$

[4]

$$P_3 = C \oplus P_1 \oplus P_2 \quad \text{(Equation 4)}$$

With a conventional retransmission method, a transmitter has to retransmit data packets $P_1$, $P_2$ and $P_3$ individually. By contrast with this, by adopting the above-described XOR retransmission method, the transmitter has only to retransmit one retransmission packet C acquired by equation 1 even when data packets $P_1$, $P_2$ and $P_3$ need to be retransmitted. By this means, with an XOR retransmission method, it is possible to reduce the amount of retransmission data.

As described above, in data packets (e.g. data packets $P_1$, $P_2$ and $P_3$ represented in equation 1) forming one retransmission packet obtained by XOR calculation (e.g. retransmission data packet C represented in equation 1), if there is one error data packet in one receiver, that receiver is able to restore the error data packet correctly using the retransmission data packet. On the other hand, if errors occur in two or more data packets in one receiver, the error data packets cannot be restored even by using retransmission data packets.

For example, in FIG. 1, receiver 1 cannot receive data packet $P_1$ correctly, receiver 2 cannot receive data packet $P_2$ or data packet $P_3$ correctly and receiver 3 cannot receive data packet $P_3$ correctly. In this case, if the transmitter retransmits retransmission data packet C obtained according to equation 1, receivers 1 and 3 are able to receive (restore) data packets $P_1$ and $P_3$ correctly, respectively. By contrast with this, data packet $P_2$ or data packet $P_3$ are not already known (that is, they are not known), and therefore receiver 2 does not receive (restore) packet $P_2$ or data packet $P_3$ correctly.

By acquiring retransmission requests from the receivers, the transmitter knows which data packets each receiver cannot receive correctly. Then, the transmitter might allocate data packets subject to XOR calculation such that only one data packet is unknown in one receiver in a group of data packets forming one retransmission data packet in XOR retransmission (hereinafter "XOR retransmission group"). For example, as described above, assume that receiver 1 cannot receive data packet $P_1$ correctly, receiver 2 cannot receive data packet $P_2$ or data packet $P_3$ correctly and receiver 3 cannot receive data packet $P_3$ correctly. In this case, the transmitter is able to transmit a retransmission data packet formed with an XOR retransmission group represented by following equation 5 or 6,

[5]

$$C_1 = P_1 \oplus P_2 \quad \text{(Equation 5)}$$

[6]

$$C_2 = P_1 \oplus P_3 \quad \text{(Equation 6)}$$

Upon receiving retransmission data packet $C_1$, receiver 1 can restore data packet $P_1$ and receiver 2 can restore data packet $P_2$. Further, upon receiving retransmission data packet $C_2$, receiver 2 can restore data packet $P_3$ and receiver 3 can restore data packet $P_3$. By forming data packets forming XOR retransmission groups in this way, each receiver can avoid two or more unknown data packets in each XOR retransmission group. However, in this case, as described above, each receiver has to report to the transmitter which data packet each receiver requests for retransmission.

Further, MBMS (Multimedia Broadcast Multicast Service) refers to the multimedia broadcast•multicast functions defined in 3GPP R6. MBMS supports two types of modes, namely, multimedia broadcast service and multicast service. Further, with MBMS, multimedia video information can be broadcast to all users or can be transmitted such that only a certain group of pay-subscribers is able to watch multimedia video information. Accordingly, MBMS is useful when the operator explores various business applications including multimedia advertisement, free or pay TV channels and collective messages. Further, an operator is able to develop mobile phone television services at a relatively low network operation cost. Generally, with MBMS, a transmitter is referred to as "base station (BS)" and a receiver is referred to as "user apparatus (i.e. user equipment: UE)." Further, currently, in 3GPP LTE (Long Term Evolution), MBMS service enhancement by E-MBMS (Evolved MBMS) is studied. In studies of MBMS in LTE, the method of feeding back NACKs using a common control channel (i.e. a common feedback channel shown in FIG. 2) in order to save uplink signaling resources is proposed. When an error is detected as a result of CRC check (Cyclic Redundancy Check) for a received data packet, each UE transmits a NACK signal on the common feedback channel shown in FIG. 2 in order to show that the UEs are unable to receive this data packet correctly. Meanwhile, each UE transmits nothing when the UEs receive the data packet correctly (when no error is detected by CRC). Upon detecting a NACK signal, the BS retransmits the data packet corresponding to that NACK signal.

Usually, with a conventional MBMS system, downlink transmission efficiency is improved using the above-described XOR retransmission method. To use this XOR retransmission method, however, it is necessary to allocate individual feedback channels on a per UE basis (dedicated feedback channels).

FIG. 3 shows an example of a conventional XOR retransmission method. In FIG. 3, the BS transmits data packets $P_1$ to $P_{12}$. Further, data packets $P_1$ to $P_6$ form XOR retransmission group 1 and data packets $P_7$ to $P_{12}$ form XOR retransmission group 2. Further, n UEs in total (UE 1 to UE n) receive data packets $P_1$ to $P_{12}$. Further, as shown in FIG. 3, in XOR retransmission group 1, errors are present in data packets $P_1$ and $P_2$ received in UE 1 ("x" shown in FIG. 3) and errors are present in data packets $P_4$ and $P_5$ received in UE 2. Further, in XOR retransmission group 2, an error is present in data packet $P_{10}$ received in UE 1.

Upon receiving data packets, as shown in FIG. 3, UEs feed back ACKs/NACKs on a per UE basis. "1" shown in FIG. 3 represents that a NACK is fed back and "0" shown in FIG. 3 represents that an ACK is fed back. In FIG. 3, the maximum XOR retransmission group length is six.

Upon receiving ACKs/NACKs fed back from the UEs, the BS knows that data packets $P_1$ and $P_2$ need to be retransmitted to UE 1 and data packets $P_4$ and $P_5$ need to be retransmitted to UE 2 in XOR retransmission group 1. Then, the BS determines two retransmission data packets $C_1$ and $C_2$ obtained by XOR calculation shown by following equation 7 or 8 for XOR retransmission group 1.

[7]

$$C_1 = P_1 \oplus P_4, C_2 = P_2 \oplus P_5 \quad \text{(Equation 7)}$$

[8]

$$C_1 = P_1 \oplus P_5, C_2 = P_2 \oplus P_4 \quad \text{(Equation 8)}$$

As represented in equation 7 or 8, if the rules for allocation of retransmission data packets by the BS in XOR retransmission groups (i.e. allocation rules in which there is only one unknown data packet in a receiver in an XOR retransmission group) are ensured, errors occur in only one data packet at maximum in any UEs receiving one retransmission data packet.

Meanwhile, the BS allocates one retransmission data packet $C_3$ represented by following equation 9 to XOR retransmission group 2.

[9]

$$C_3 = P_{10} \quad \text{(Equation 9)}$$

Upon transmitting a retransmission data packet using the XOR retransmission method, however, the BS has to report to UEs at the same time how many data packets are included in the retransmission data packet.

In this way, if the BS knows which data packet each UE needs to be retransmitted, the BS is able to determine retransmission data packets in each XOR retransmission group according to the allocation rules under the XOR retransmission method. However, in this case, it is necessary to allocate individual feedback channels on a per UE basis (dedicated feedback channels), and therefore, uplink signaling overhead increases. To be more specific, as shown in FIG. 3, uplink signaling increases linearly according to an increase of the number of UEs.

Non-Patent Document 1: "XOR Retransmission in Multicast Error Recovery," Shen Yong and Lee Bu Sung; Networks, 2000 (ICON 2000), September 2000, Pages :336-340

DISCLOSURE OF INVENTION

Problems to be Solved by the Invention

It is therefore an object of the present invention to provide a retransmission method, a base station and a user apparatus in a multicast system that allow the amount of retransmission data and uplink signaling overhead to be reduced.

Means for Solving the Problem

According to an aspect of the present invention, a retransmission method in a multicast system including a base station and at least one user apparatus, includes: a transmission step of transmitting to the base station a first message showing a position of an error detected later between two errors when the two errors are detected in a plurality of data packets received in the user apparatus; a determination step of determining a retransmission group including at least one data packet based on the first message; and a retransmission step of transmitting the retransmission group.

According to another aspect of the present invention, a base station apparatus in a multicast system adopts a configuration including: a reception section that receives a first message showing a position of an error detected later between two errors when the two errors are detected in a plurality of data packets received in at least one user apparatus; a determination section that determines a retransmission group including at least one data packet based on the first message; and a retransmission section that transmits the retransmission group.

According to another aspect of the present invention, a user apparatus in a multicast system adopts a configuration including: a reception section that receives a plurality of data packets; a check section that checks whether or not an error is present in the plurality of data packets; a count section that counts the number of errors detected in the plurality of data packets; a generation section that generates a first message showing a position of an error detected later between two errors when the number of errors counted is two; and a transmitting section that transmits the first message.

Advantageous Effects of Invention

According to the present invention, it is possible to reduce the amount of retransmission data and uplink signaling overhead.

BRIEF DESCRIPTION OF DRAWINGS

These and other objects, features, aspects and advantages of the present invention will become more apparent from the following detailed description of the present invention when taken in conjunction with the accompanying drawings, in which:

FIG. 15 shows comparison between a conventional method according to another embodiment of the present invention and the present invention.

BEST MODE FOR CARRYING OUT THE INVENTION

Now, an embodiment of the present invention will be described in detail with reference to the accompanying drawings.

Figure 4:
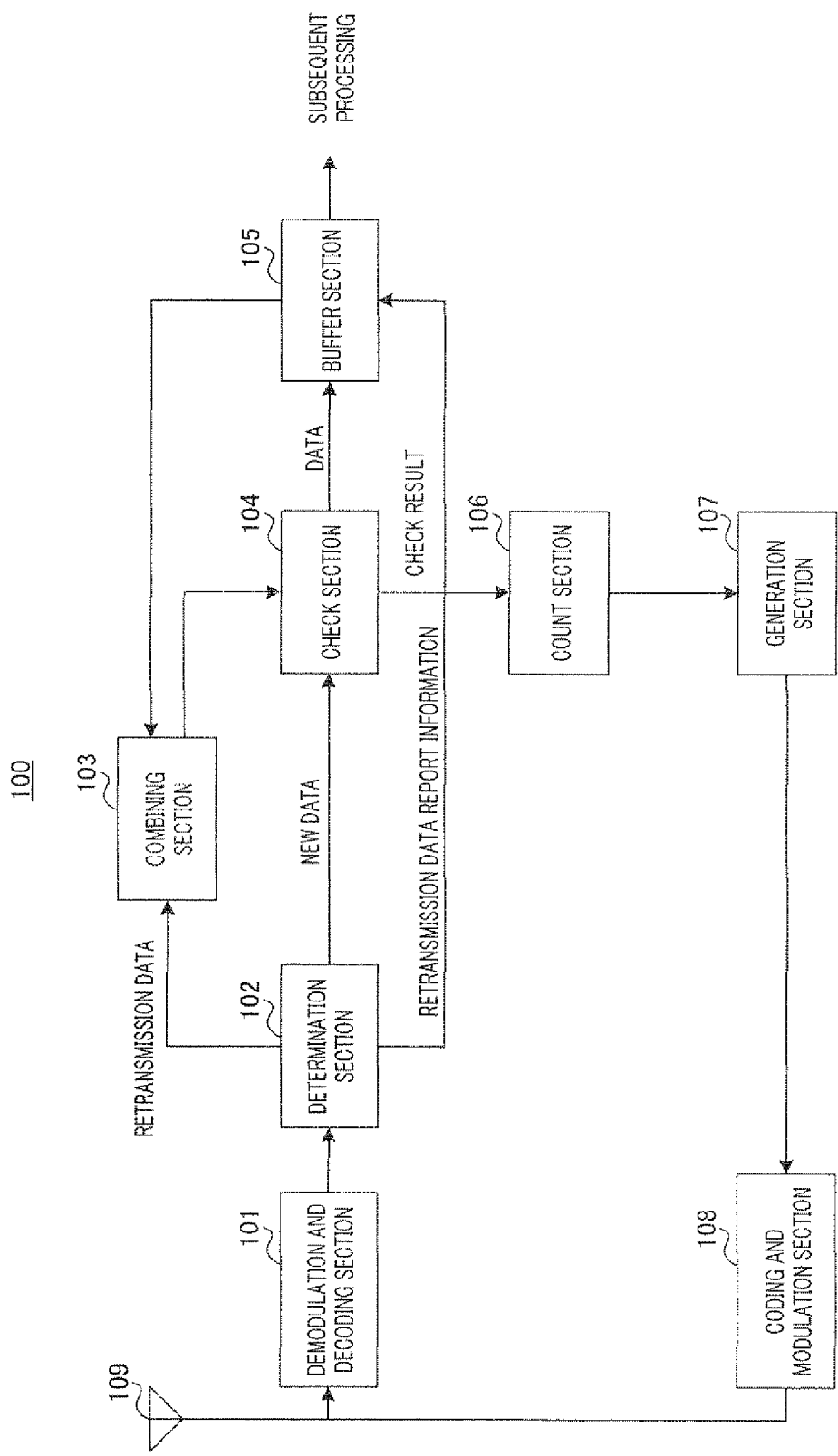
FIG. 4 is a block diagram showing a configuration of a user apparatus according to an embodiment of the present invention.

FIG. 4 is a block diagram showing a configuration of a user apparatus according to an embodiment of the present invention.

User apparatus 100 according to an embodiment of the present invention shown in FIG. 4 receives a plurality of data (data packets) from base station 200 (described later). Demodulation and decoding section 101 then performs demodulation and channel decoding on the data received (bits) via antenna 109, and outputs the data after channel decoding to determination section 102. Determination section 102 determines the type of data received as input from demodulation and decoding section 101 (for example, whether data is new data, retransmission data or retransmission data report information). Here, retransmission data information is used to determine buffered data to be subject to retransmission combining, by reporting to buffer section 105 which retransmission data is retransmitted for which data. Determination section 102 then outputs new data to check section 104, outputs retransmission data to combining section 103, and outputs retransmission data report information to buffer section 105.

Check section 104 performs error check (error detection) like a CRC check for new data received as input from determination section 102, or for data after retransmission combining received as input from combining section 103, to check whether or not errors are present in a plurality of received data packets. Check section 104 then outputs, for example, an ACK or NACK for each data packet to count section 106 as a check result. Further, check section 104 outputs the data to buffer section 105. Buffer section 105 stores the data received as input from check section 104 in a buffer. Further, buffer section 105 outputs the buffered data to combining section 103 based on retransmission data report information received as input from determination section 102.

When retransmission data is received as input from determination section 102, combining section 103 combines (performs retransmission combining on) retransmission data received as input from determination section 102 (data retransmitted for error data packets) and the data received as input from buffer section 105 (data that is received before the previous time and that corresponds to retransmission data). For example, combining section 103 performs retransmission combining using a CC (Chase Combining)-based combining method or an IR (Incremental Redundancy)-based combining method as a retransmission combining method. Then, combining section 103 outputs the data after combining to check section 104.

Count section 106 counts the number of NACKs received as input from check section 104 in the process of receiving data. That is, count section 106 counts the number of errors detected in a plurality of received data packets. Further, if the number of NACKs counted is two, count section 106 commands generation section 107 to generate an MNI (Multiple NACK Indicator) message showing the position of the error detected later between the two errors, and resets the count of NACKs to zero. Further, if two errors are not detected in a plurality of data packets and the number of received data packets reaches the maximum XOR retransmission group length (e.g. six), count section 106 resets the count of NACKs to zero. Further, count section 106 outputs the NACKs received as input from check section 104 to generation section 107.

If NACKs are received as input from count section 106, that is, if errors are present in data packets received by the user apparatus, generation section 107 generates a NACK message for those data packets. Further, generation section 107 is commanded to generate an MNI message from count 106, that is, if the number of errors detected in an XOR retransmission group is two, generation section 107 generates an MNI message corresponding to the position of the error detected later between the two errors. Generation section 107 then outputs the generated NACK message or MNI message to coding and modulation section 108.

Coding and modulation section 108 performs channel coding and modulation on the NACK message or MNI message received as input from generation section 107. Then, in LTE, coding and modulation section 108 maps the NACK message and the MNI message to codes (or code sequences) specified on the common feedback channel, and outputs the messages to base station 200 through the common feedback channel.

Figure 5:
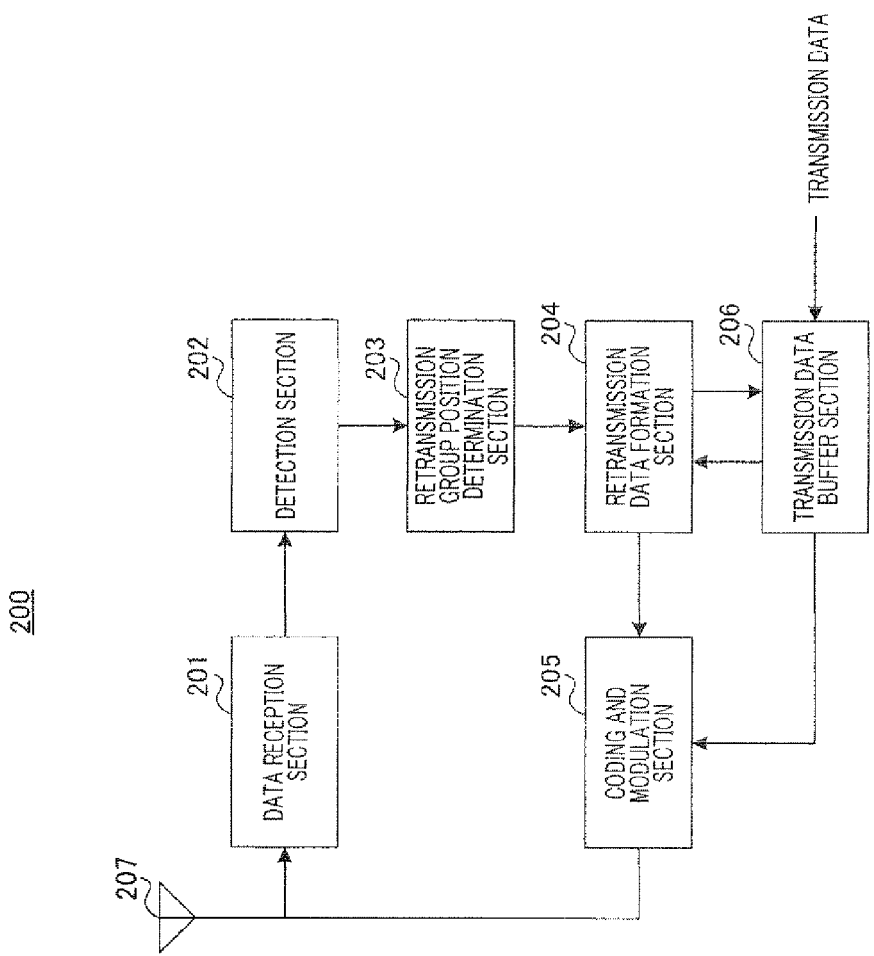
FIG. 5 is a block diagram showing a configuration of a base station according to an embodiment of the present invention.

FIG. 5 is a block diagram showing the configuration of the base station according to an embodiment of the present invention. In base station 200 shown in FIG. 5, coding and modulation section 205 performs channel coding and modulation on data (new data) received as input from transmission data buffer section 206, and transmits the modulated data via antenna 207. Here, as described above, when errors are detected in data packets in user apparatus 100 (FIG. 4), base station 200 receives information showing that error data packets have been received in user apparatus 100 (i.e. a NACK message or MNI message) via the feedback channel. Specifically, data reception section 201 receives the data via antenna 207, and extracts the part where the NACK message is mapped (NACK channel) and the part where the MNI message is mapped (MNI channel) in the common feedback channel. Data reception section 201 then outputs the extracted NACK message and the MNI message to detection section 202.

Detection section 202 detects whether or not a NACK or MNI is set in the NACK message or MNI message received as input from data reception section 201. Detection section 202 outputs the detected NACK or MNI-related information (information including positions of data packets corresponding to the NACK message or a position of data packet corresponding to the MNI message) to retransmission group position determination section 203.

Retransmission group position determination section 203 determines the start position and the end position of an XOR retransmission group according to the information about the NACK and MNI received as input from detection section 202. Then, retransmission group position determination section 203 outputs the start position and the end position of the XOR retransmission group to retransmission data formation section 204. Further, if NACK and MNI-related information is not outputted from detection section 202 (that is, if a NACK or MNI is not received), retransmission is not required, and therefore retransmission group position determination section 203 does nothing.

Based on the start position and the end position of the XOR retransmission group received as input from retransmission group position determination section 203, retransmission data formation section 204 forms a bit sequence (bit stream) of data packets (bits) included in the XOR retransmission group using data packets stored in transmission data buffer section 206. Then, retransmission data formation section 204 outputs the formed bit stream to coding and modulation section 205. Transmission data buffer section 206 stores transmission data (new data) in a buffer, and outputs the data to coding and modulation section 205. Further, transmission data buffer section 206 outputs the data packets from the start position to the end position of the XOR retransmission group, received as input from retransmission data formation section 204. Coding and modulation section 205 performs channel coding and modulation on the bit stream (retransmission data) received as input from retransmission data formation section 204, and transmits the modulated data (that is, a retransmission data packet in the XOR retransmission group) via antenna 207.

Base station 200 also transmits position information designating the start position and the end position of the XOR retransmission group in addition to the data (bit stream) formed in retransmission data formation section 206.

Figure 1:
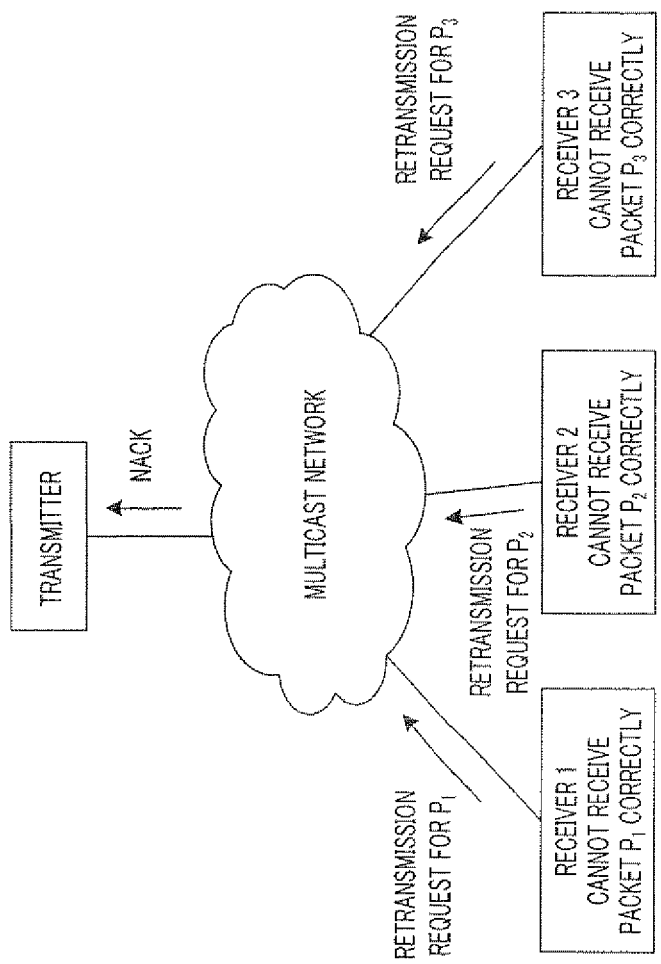
FIG. 1 illustrates a conventional multicast system performing XOR retransmission.
Figure 2:
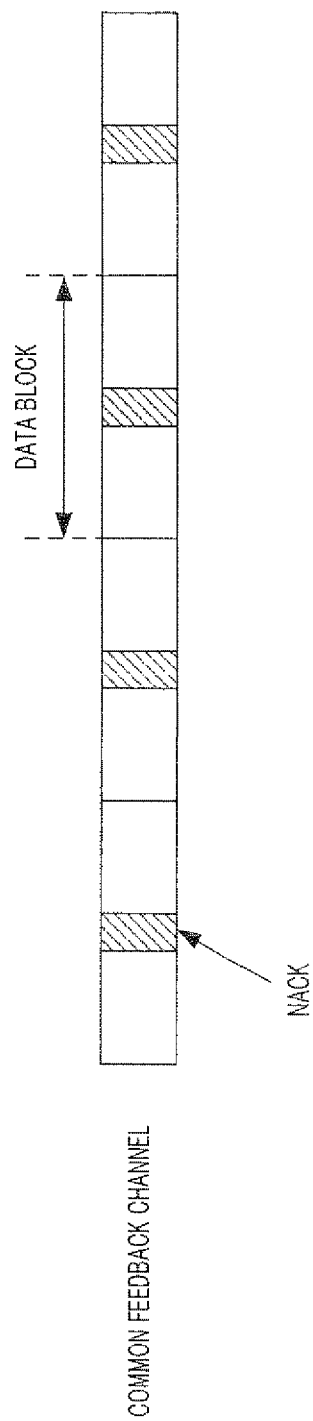
FIG. 2 illustrates a conventional common feedback channel in MBMS.
Figure 6:
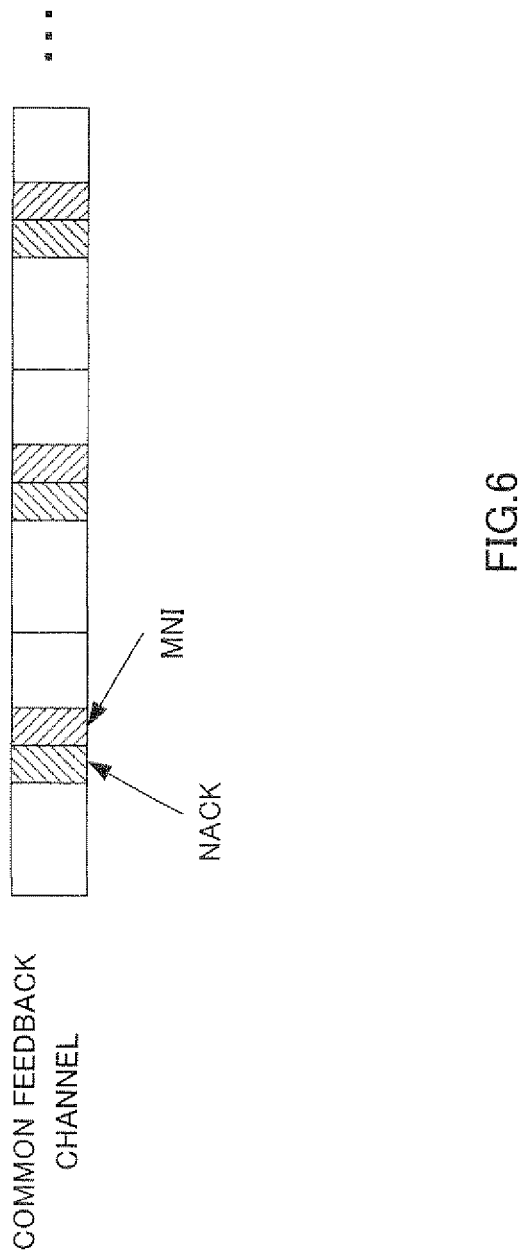
FIG. 6 illustrates a common feedback channel used in XOR retransmission according to an embodiment of the present invention.

With an embodiment of the present invention, the maximum XOR retransmission group length is set according to a conventional MBMS delay request. Further, as shown in FIG. 6, positions for mapping MNI messages are added in the common feedback channel shown in FIG. 2. When two errors (NACKs) occur in each XOR retransmission group, the UE (user apparatus 100) transmits an MNI message through a common feedback channel (i.e. a message showing the position of the error detected later between the two errors). Then, upon receiving the MNI message through the common feedback channel, base station 200 determines an XOR retransmission group including at least one data packet based on the MNI message, and transmits the XOR retransmission group (retransmission data packets).

Next, the operation of XOR retransmission between user apparatus 100 (UE) and base station 200 (BS) will be explained in detail.

Figure 7:
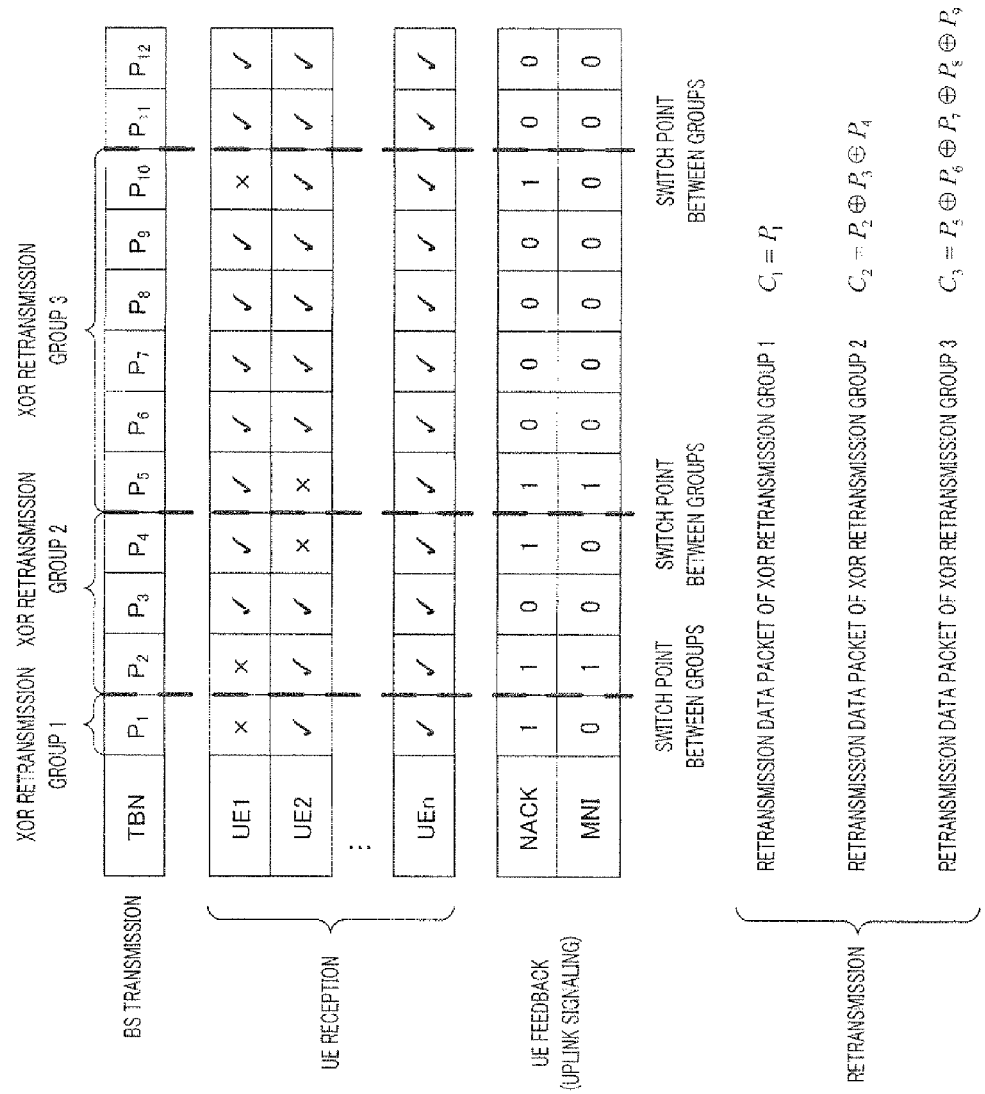
FIG. 7 illustrates a conventional XOR retransmission method according to an embodiment of the present invention.

FIG. 7 illustrates XOR retransmission according to an embodiment of the present invention. In FIG. 7, similar to FIG. 3, the maximum XOR retransmission group length is set to "6." Further, n UEs in total (UE 1 to UE n) each having the configuration of user apparatus 100, receive a plurality of data packets $P_1$ to $P_{12}$ as in FIG. 3. In the MNI shown in FIG. 7, "1s" represent that MNI messages are set and "0s" represent that MNI messages are not set. Further, upon starting each XOR retransmission group, count section 106 in each UE resets the count of NACKs to zero.

As shown in FIG. 7, detection section 104 in UE 1 performs CRC check for data packet $P_1$, and if an error is detected, generates a NACK corresponding to data packet $P_1$ as a detection result and generation section 107 generates a NACK message. UE 1 then transmits a NACK message mapped to a common feedback channel (the NACK corresponding to $P_1$ shown in FIG. 7="1"). In this case, the number of NACKs counted in count section 106 in UE 1 is one.

Next, as shown in FIG. 7, detection section 104 in UE 1 detects that an error is also present in data packet $P_2$. Then, in count section 106, the number of NACKs counted is two. If the number of NACKs counted is two, that is, if two errors are detected in a plurality of received data packets, count section 106 commands generation section 107 to generate an MNI message corresponding to data packet $P_2$, which is the position of the error detected later between the two errors. Then, generation section 107 generates a NACK message (the NACK corresponding to $P_2$ shown in FIG. 7="1") and an MNI message (the MNI corresponding to $P_2$ shown in FIG. 7="1").

Then, as shown in FIG. 7, UE 1 transmits the NACK message and the MNI message corresponding to data packet $P_2$ through a common feedback channel. Simultaneously, count section 106 in UE 1 resets the count of NACKs to zero.

Meanwhile, data reception section 201 in the BS receives the MNI message corresponding to data packet $P_2$ through the common feedback channel. In this case, detection section 202 determines that there is at least one UE in which errors occur in two data packets from data packet $P_1$ to data packet $P_2$ at the time each UE receives data packet $P_2$. Retransmission group position determination section 203 then determines the start position of the first XOR retransmission group (XOR retransmission group 1 shown in FIG. 7) to be data packet $P_1$ and determines the end position to be data packet $P_1$. Retransmission data formation section 204 then determines retransmission data packet $C_1$ for XOR retransmission group 1, which is represented by following equation 10.

[10]

$$C_1 = P_1 \quad \text{(Equation 10)}$$

Further, at the same time, retransmission group position determination section 203 determines the start position of a second XOR retransmission group (XOR retransmission group 2 shown in FIG. 7) to be data packet $P_2$. Next, upon detecting an error in $P_4$, UE 2 shown in FIG. 7 transmits a NACK message corresponding to data packet $P_4$ (the NACK corresponding to $P_4$ shown in FIG. 7="1"). In this case, the number of NACKs counted in count section 106 in UE 2 is one. Next, upon detecting an error in $P_5$, UE 2 transmits a NACK message corresponding to data packet $P_5$ (the NACK corresponding to $P_5$ shown in FIG. 7="1"). Further, the number of NACKs counted in count section 106 in UE 2 is two, and therefore, UE 2 transmits the MNI message corresponding to data packet $P_5$, which is the position of the error detected later between two errors (the MNI corresponding to $P_5$ shown in FIG. 7="1"). In this case, the BS receives an MNI message="1" at the time each UE receives data packet $P_5$. The BS then determines that there is at least one UE in which errors occur in two data packets from data packet $P_2$ to data packet $P_5$, and determines that, in all UEs, an error occurs in only one data packet at maximum from data packet $P_2$ to data packet $P_4$. Accordingly, retransmission group position determination section 203 of the BS determines the start position of a second XOR retransmission group (XOR retransmission group 2 shown in FIG. 7) to be data packet $P_2$, and determines the end position to be data packet $P_4$. Retransmission data formation section 204 then determines retransmission data packet $C_2$ for XOR retransmission group 2, which is represented by following equation 11. That is, retransmission group position determination section 203 and retransmission data formation section 204 determine a retransmission group such that the number of error data packets is only one or less in each UE in data packets included in an XOR retransmission group.

[11]

$$C_2 = P_2 \oplus P_3 \oplus P_4 \quad \text{(Equation 11)}$$

Further, there are no UEs in which errors occur in two or more data packets between data packet $P_5$ and data packet $P_{10}$ shown in FIG. 7 and the length of the XOR retransmission group reaches at six of maximum, so that retransmission group position determination section 203 determines the start position of a third retransmission group (XOR retransmission group 3 shown in FIG. 7) to be data packet $P_5$ and determines the end position to be data packet $P_{10}$. Further, the NACKs corresponding to data packet $P_5$ and data packet $P_{10}$ are set to be "1" between data packets $P_5$ and $P_{10}$. BS retransmission data formation section 204 in the BS then determines retransmission data packet $C_3$ for XOR retransmission group 3, which is represented by following equation 12.

[12]

$$C_3 = P_5 \oplus P_6 \oplus P_7 \oplus P_8 \oplus P_9 \oplus P_{10} \quad \text{(Equation 12)}$$

Then, coding and modulation section 205 of the BS performs channel coding and modulation for the retransmission data packets in the above XOR retransmission groups 1 to 3, and transmits the modulated data packets via an antenna. By also transmitting signaling at the same as transmitting the retransmission data packets, the BS has to transmit retransmission data report information showing the start positions and the end positions of XOR retransmission groups 1 to 3. That is, the BS transmits XOR retransmission groups (retransmission data packets) and retransmission data report information at the same time.

Upon receiving the retransmission data packets in the XOR retransmission groups, determination section 102 of each UE determines that the received data is retransmission data, and outputs the retransmission data packets to combining section 103. Further, to determine data to be combined with the retransmission data in combining section 103, determination section 102 outputs the retransmission data report information received at the same time as the retransmission packets to buffer section 105. Two types of combining methods, for example, a CC-based combining method and an IR-based combining method are the combining methods in HARQ used in combining section 103.

Figure 8:
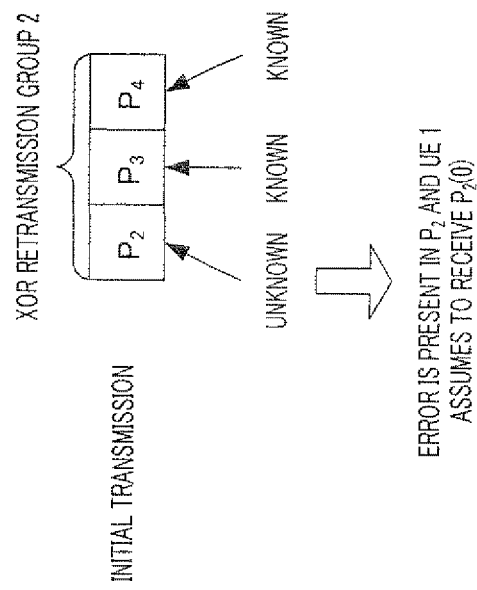
FIG. 8 illustrates CC-based XOR combining according to an embodiment of the present invention.

First, CC-based XOR retransmission combining will be explained. Here, XOR retransmission group 2 shown in FIG. 7 will be explained as an example. That is, the BS transmits retransmission data packet $C_2$ upon retransmission. Here, as shown in FIG. 8, upon initial transmission of data packets $P_1$ to $P_{12}$, with UE 1, data packets $P_3$ and $P_4$ (no error) are known and data packet $P_2$ is unknown (error present). Accordingly, assume that UE 1 receives estimation value $P_2(0)$ of data packet $P_2$ upon initial transmission. Here, estimation value $P_x(Y)$ represents the estimation value of data packet $P_x$, upon Y-th retransmission (where Y=0 upon initial transmission). Here, if UE 1 receives retransmission data packet $C_2(1)$, estimation value $P_2(1)$ of $P_2$ upon first retransmission represented by following equation 13 is obtained. Here, retransmission data packet $C_x(Y)$ represents the retransmission data packet of XOR retransmission group X upon Y-th retransmission.

[13]

$$P_2(1) = C_2(1) \oplus P_3 \oplus P_4 \quad \text{(Equation 13)}$$

UE 1 then CC-combines $P_2(0)$ and $P_2(1)$, and checks whether or not an error is present in $P_2$ after combining. When an error is present in $P_2$ after combining, further retransmission is required, so that UE 1 transmits a retransmission request (NACK) to the BS. The BS then performs second retransmission of retransmission data packet $C_2$. Here, when UE 1 receives retransmission data packet $C_2(2)$ upon the second retransmission, estimation value $P_2(2)$ of $P_2$ in the second retransmission represented by following equation 14.

[14]

$$P_2(2) = C_2(2) \oplus P_3 \oplus P_4 \quad \text{(Equation 14)}$$

UE 1 then CC combines $P_2(0)$, $P_2(1)$ and $P_2(2)$, and checks whether or not an error is present in $P_2$ after combining. As shown in FIG. 8, it shows that the CC-based combination method of XOR retransmission is basically the same as a conventional CC combining method.

Figure 9A:
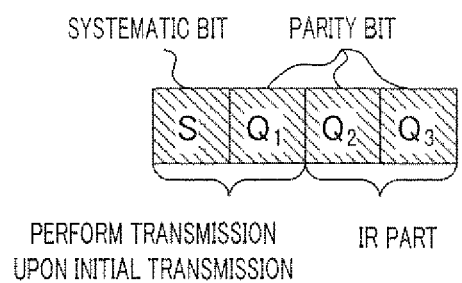
FIG. 9A illustrates IR-based XOR combining according to an embodiment of the present invention.
Figure 9B:
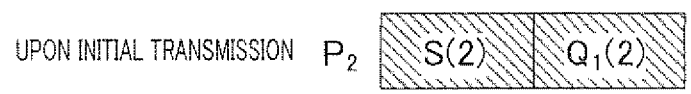
FIG. 9B illustrates IR-based XOR combining according to an embodiment of the present invention.

Next, IR-based XOR retransmission combining will be explained. Here, XOR retransmission group 2 shown in FIG. 7 will be explained as an example. Further, as shown in FIG. 9A, each data packet after channel coding is composed of systematic bit S and parity bits $Q_1$, $Q_2$ and $Q_3$. Further, upon first transmission (initial transmission), only systematic bit S and parity bit $Q_1$ are transmitted. For example, in data packet $P_2$ upon initial transmission, as shown in FIG. 9B, only systematic bit $S(2)$ and parity bit $Q_1(2)$ are transmitted. Here, $S(x)$ represents the systematic bit of $P_x$ and $Q(x)$ represents the parity bit of $P_x$. As shown in FIG. 7, UE 1 cannot decode received data packet $P_2$ correctly. UE 1 then requests to retransmit data packet $P_2$. Then, upon first retransmission, the BS transmits retransmission data packet $C_2(1)$ represented by following equation 15.

[15]

$$C_2(1) = Q_2(2) \oplus Q_2(3) \oplus Q_2(4) \quad \text{(Equation 15)}$$

Here, UE 1 is able to decode data packets $P_3$ and $P_4$ correctly, and therefore, parity bits $Q_2(3)$ and $Q_2(4)$ are known. Accordingly, UE 1 restores parity bit $Q_2(2)$ according to following equation 16.

[16]

$$Q_2(2) = C_2(1) \oplus Q_2(3) \oplus Q_2(4) \quad \text{(Equation 16)}$$

Then, based on systematic bit $S(2)$ and parity bit $Q_1(2)$ and $Q_2(2)$, UE 1 decodes data packet $P_2$ and checks whether or not decoding can be performed correctly. Here, if a second retransmission is also required, that is, if an error is detected in data packet $P_2$, the BS transmits retransmission data packet $C_2(2)$ represented by following equation 17.

[17]

$$C_2(2) = Q_3(2) \oplus Q_3(3) \oplus Q_3(4) \quad \text{(Equation 17)}$$

Similar to the first retransmission, UE 1 is able to decode data packets $P_3$ and $P_4$ correctly, so that parity bit $Q_3(3)$ and $Q_3(4)$ are known. Accordingly, UE 1 restores parity bit $Q_3(2)$ according to following equation 18.

[18]

$$Q_3(2)=C_2(2)\oplus Q_3(3)\oplus Q_3(4) \quad \text{(Equation 18)}$$

Then, based on systematic bit S(2) and parity bit $Q_1(2)$, $Q_2(2)$ and $Q_3(2)$, UE 1 decodes data packet $P_2$ and checks whether or not decoding can be performed correctly.

Further, the bits outputted from combining section 103 of UE 1 (data packets after combining) are inputted to check section 104 again and checked, stored in buffer section 105, and the same processing as above is performed.

Figure 10:
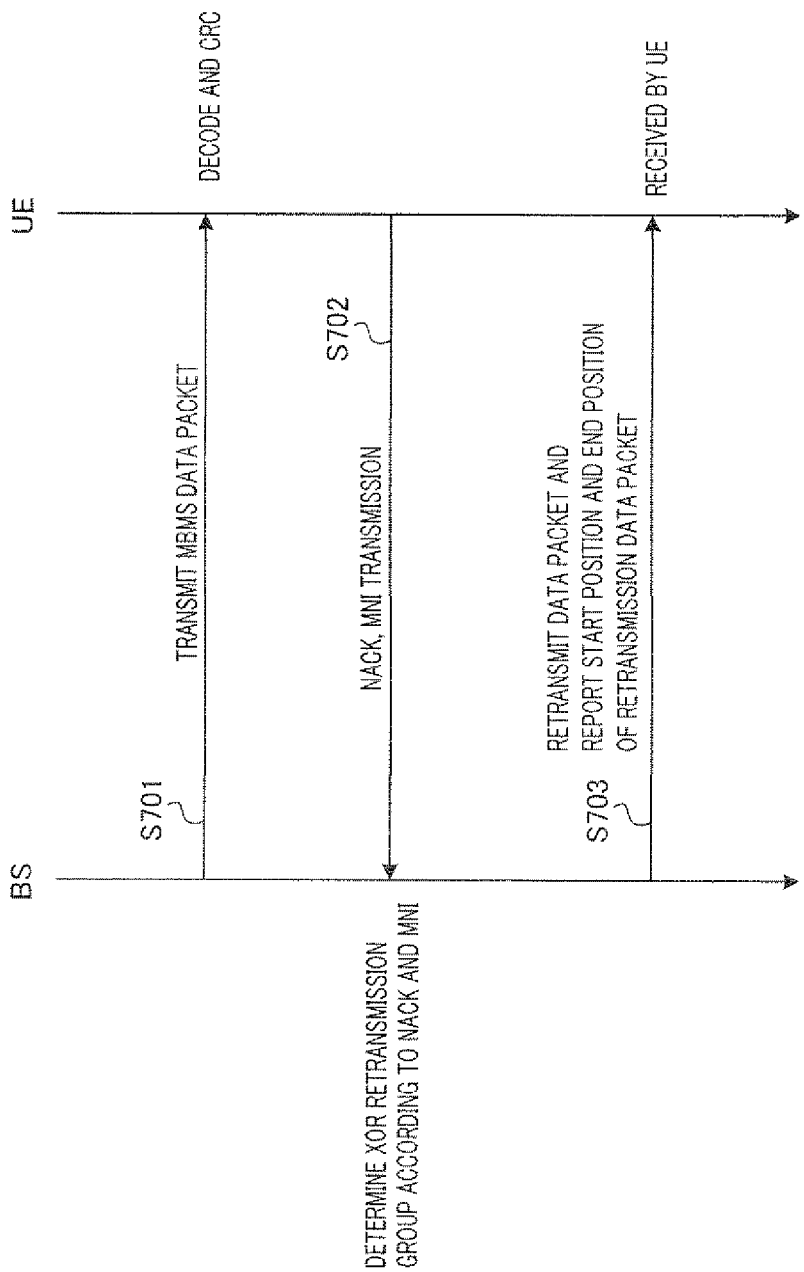
FIG. 10 is a flowchart showing the XOR retransmission method according to an embodiment of the present invention.

FIG. 10 is a flowchart showing the XOR retransmission method of the present embodiment.

In step (hereinafter, simply "S") 701, the BS transmits MBMS data packets to UEs. Then, upon receiving the MBMS data packets, for example, UE 1 shown in FIG. 7 performs modulation and channel decoding on the data packets in demodulation and decoding section 101, and performs CRC check on the decoded data packets in check section 104. When an error is detected in data packet $P_1$, count section 106 of UE 1 counts a NACK and generation section 107 generates a NACK message. UE 1 then transmits the NACK message to the BS through a common feedback channel. The number of NACKs counted is one in this case. Next, when error is detected at data packet $P_2$ in check section 104 in UE 1, the number of NACKs counted in count section 106 is two. When the number of NACKs counted is two, count section 106 commands generation section 107 to generate an MNI message corresponding to data packet $P_2$ (to set the MNI corresponding to $P_2$="1"). Then, generation section 107 generates a NACK message (the NACK corresponding to $P_2$ shown in FIG. 7="1") and an MNI message (the MNI corresponding to $P_2$ shown in FIG. 7="1"). Then, in a common feedback channel, UE 1 maps the NACK message to a NACK channel corresponding to data packet $P_2$ and maps the MNI message to an MNI channel. Further, count section 106 in UE 1 resets the count of NACKs to zero.

In S 702, each UE transmits the NACK message and the MNI message through a common feedback channel according to CRC. Retransmission group position determination section 203 of the BS determines the start positions and the end positions of XOR retransmission groups according to the received NACK message and the MNI message, and retransmission data formation section 204 determines retransmission data packets based on the start positions and the end positions of the XOR retransmission groups.

In S 703, the BS retransmits the retransmission data packets of the XOR retransmission groups and reports the start positions and the end positions of data packets forming the XOR retransmission groups through downlink signaling.

Next, variations of the XOR retransmission method according to an embodiment of the present invention will be explained.

<Variation 1>

Figure 11:
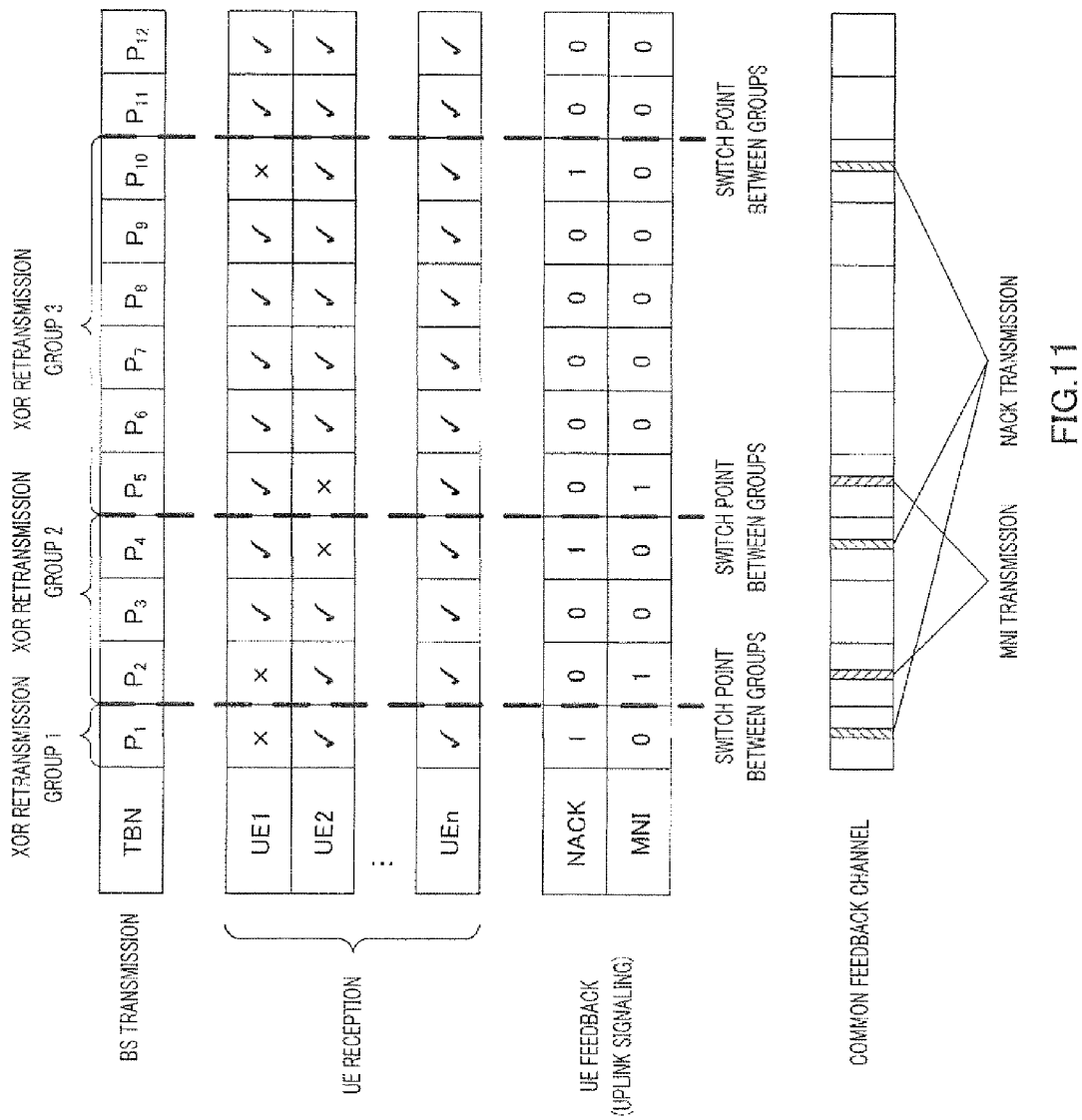
FIG. 11 illustrates the XOR retransmission method according to variation 1 of an embodiment of the present invention.

FIG. 11 shows the XOR retransmission method in this variation. With this variation, when two errors are detected in a plurality of data packets received in a given UE (user apparatus 100), count section 106 of the UE commands generation section 107 to generate only an MNI message. That is, this variation differs from the XOR retransmission method in FIG. 7 in transmitting only an MNI message without transmitting a NACK message from a UE.

Upon receiving an MNI message, a BS (base station 200) naturally knows that there is a UE detecting an error in a data packet, which is the position designated in this MNI message. For example, in FIG. 11, UE 1 generates an MNI message for data packet $P_2$ (to set the MNI corresponding to $P_2$="1") without generating a NACK message. That is, while detecting an error in received data packet $P_2$, UE 1 does not transmit a NACK message corresponding to data packet $P_2$. However, upon receiving an MNI message corresponding to data packet $P_2$, the BS is able to determine that there is a UE detecting error in data packet $P_2$.

<Variation 2>

Figure 12:
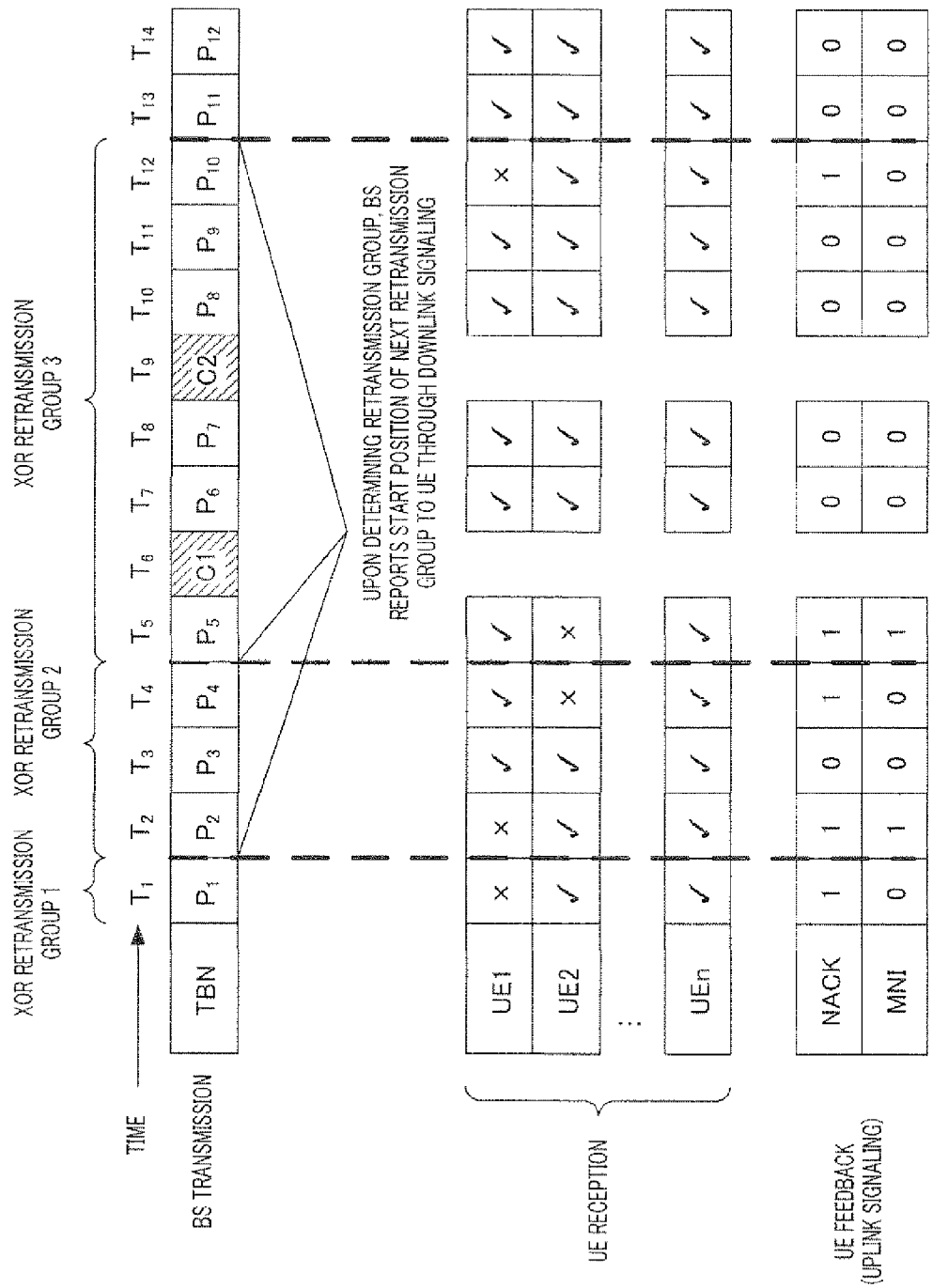
FIG. 12 illustrates the XOR retransmission method according to variation 2 of an embodiment of the present invention.

FIG. 12 shows the XOR retransmission method in this variation. In FIG. 12, for example, when retransmission group position determination section 203 of a BS determines an XOR retransmission group, the BS transmits the XOR retransmission group after four frame intervals. That is, the BS transmits an XOR retransmission group at the predetermined time after the BS receives an MNI message (here, the time after four frame intervals). Specifically, in FIG. 12, the BS receives an MNI message at time $T_2$. Further, only data packet $P_1$ is included in XOR retransmission group 1, so that the BS knows that the start position of the next XOR retransmission group 2 is the data packet $P_2$. Then, the BS transmits retransmission data report information showing that the next XOR retransmission group 2 is the data packet $P_2$ through a downlink common channel. Accordingly, count sections 106 of UEs start counting NACKs from data packet $P_2$. Further, the BS transmits retransmission data packet $C_1$ at time $T_6$ after four frame intervals of $T_6$ the MNI message is received. The following processing is performed in the same way.

<Variation 3>

Figure 13:
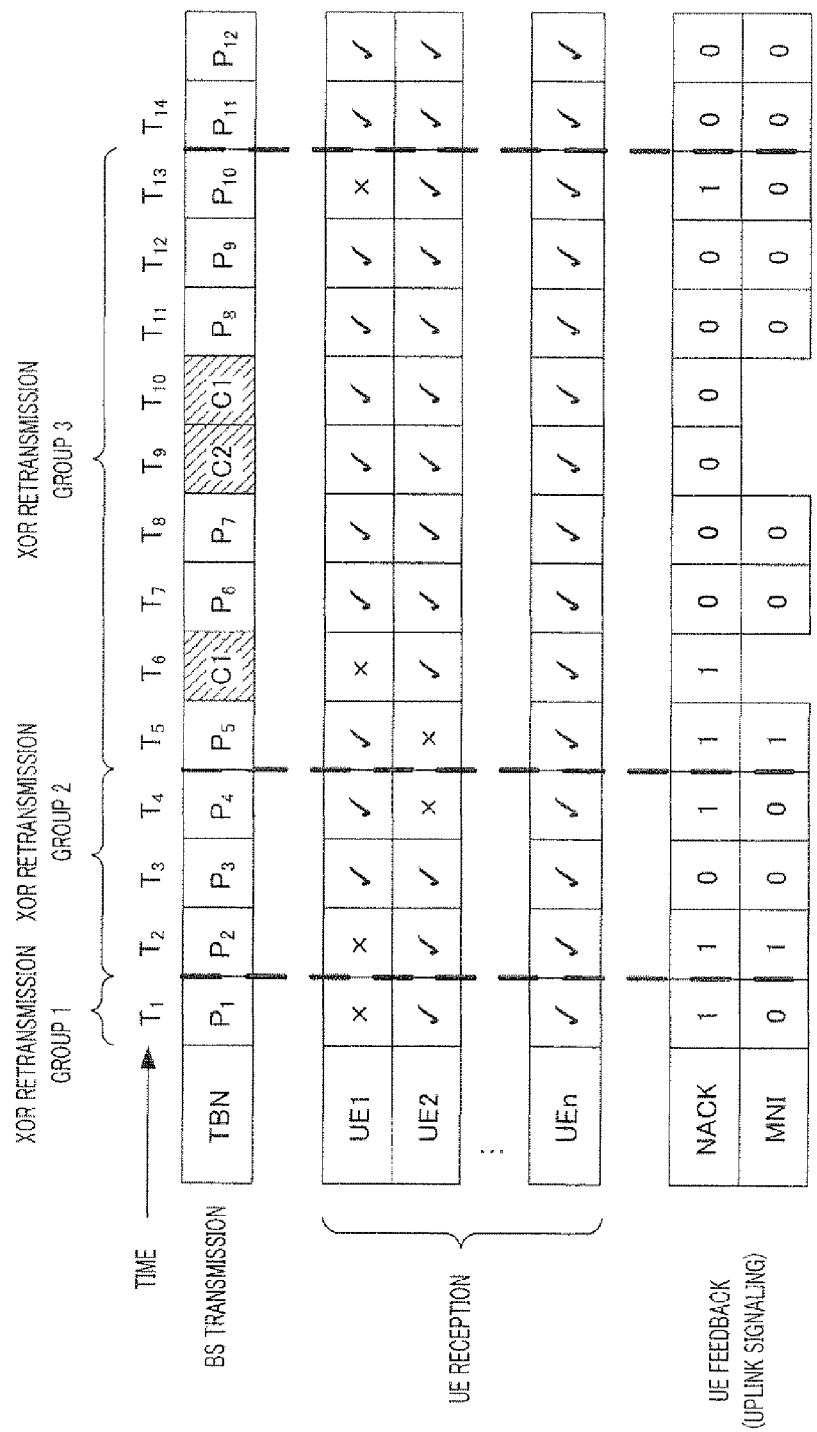
FIG. 13 illustrates the XOR retransmission method according to variation 3 of an embodiment of the present invention.

FIG. 13 shows a case where XOR retransmission is performed in a plurality of times for the same retransmission data packet. At time $T_6$ shown in FIG. 13, a BS transmits retransmission data packet $C_1$ (equation 10) of XOR retransmission group 1. Here, the BS has to report that retransmission data packet $C_1$ is retransmission data at the same time. The BS then reports the start position and the end position of data packets subject to XOR calculation in XOR retransmission group 1. Retransmission data packet $C_1$ only includes data packet $P_1$, and therefore the start position and the end position of XOR retransmission group 1 are both at data packet $P_1$. That is, UE 1 acquires $P_1$ by retransmission data packet $C_1$. Although retransmission data packet $C_1$ is retransmitted at time $T_6$ shown in FIG. 13, UE 1 is still not able to decode data packet $P_1$ correctly. Then, UE 1 transmits a NACK message at time $T_6$ (NACK corresponding to retransmission data packet $C_1$ (i.e. data packet $P_1$)="1"). Then, upon receiving the NACK message corresponding to retransmission data packet $C_1$, the BS transmits retransmission data packet $C_1$ again. For example, as shown in FIG. 13, the BS retransmits retransmission data packet $C_1$ at time $T_{10}$. In this way, an MNI message is not generated for retransmissions in a plurality of times of retransmission data packets (second and subsequent times).

<Variation 4>

With an MBMS service, received quality of each UE varies. Accordingly, received quality of data received by a given user is significantly low depending on a QoS request (quality of service: service quality) and errors may frequently occur. Then, even if errors occur in two data packets in UEs having lower QoS than a predetermined threshold value, this variation allows UEs to determine by choice not to transmit an MNI message. For example, UEs having lower QoS than a predetermined threshold value are disallowed to transmit an MNI message. By this means, by repeating retransmissions frequently from a BS to UEs having lower QoS, it is possible to reduce the influence upon normal transmission by other UEs. That is, even when two errors are detected in a plurality of received data packets, UEs having lower QoS than a predetermined threshold are able to reduce the influence on transmission efficiency of the entire system by not transmitting an MNI message.

<Variation 5>

In the above-described embodiment, information designating the starting positions and the end positions of data packets included in XOR retransmission groups (retransmission data report information) is included in retransmission data. However, if retransmission data is formed anew, an irregular delay time can be provided. Then, a BS may report the start positions and end positions to UEs through irregular signaling, apart from retransmission data packets. For example, like XORPOS (XOR position), which is downlink common broadcast signaling, irregular signaling may be added on a downlink common control channel.

Figure 14:
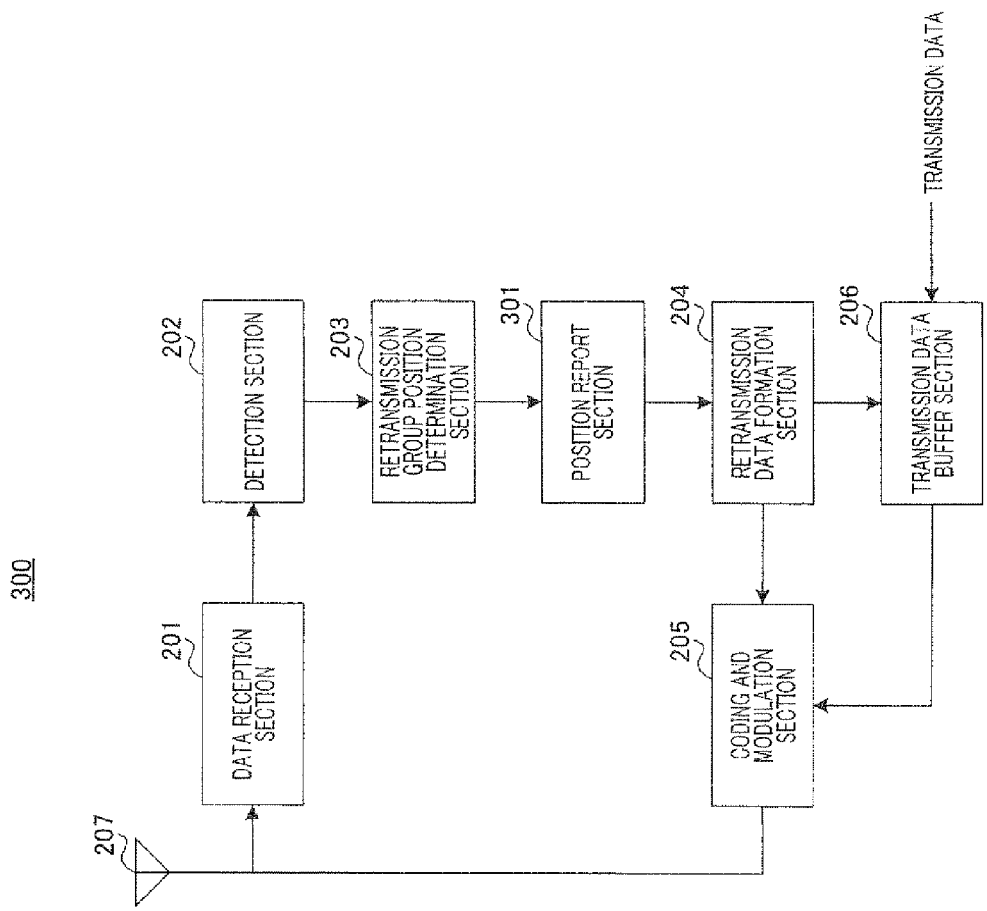
FIG. 14 illustrates the XOR retransmission method according to variation 4 of an embodiment of the present invention.

Specifically, upon detecting errors in a plurality of received data packets, user apparatus 100 (UE) feeds back information showing that error data packets (MNI message or NACK message) have been transmitted to base station 300 (BS) according to this variation shown in FIG. 14 via a common feedback channel. In this case, data reception section 201 of BS 300 (FIG. 14) receives data via antenna 207, extracts an MNI message and a NACK message from the positions corresponding to the MNI message and the NACK message in a common feedback channel, and outputs the messages to detection section 202.

Detection section 202 acquires the MNI message and the NACK message received as input from rata reception section 201 and determines whether or not the MNI message and the NACK message are set. After that, information about the detected MNI message and NACK message is transmitted to retransmission group determination section 203.

Retransmission group position determination section 203 determines the start position and the end position of an XOR retransmission group according to the positions of the MNI message and the NACK message received as input from detection section 202 (i.e. the data packets in which a second error is detected). Then, retransmission group position determination section 203 outputs the start position and the end position of the XOR retransmission group to position report section 301. Position report section 301 transmits the start position and the end position of the retransmission group to user apparatus 100 through a downlink common control channel. Further, position report section 301 outputs the start position and end position to retransmission data formation section 204.

Retransmission data formation section 204 forms a data packet (bit stream) to be included in the XOR retransmission group according to the start position and end position of the XOR retransmission group, and transmits the formed data packet (retransmission data packet) to coding and modulation section 205. Coding and modulation section 205 modulates the bit stream to codes and performs transmission.

Further, the time next to the end position of an XOR retransmission group is the start position of the next XOR retransmission group. Then, as another embodiment, position report section 301 in base station 300 shown in FIG. 14 may transmit only the end position of an XOR retransmission group to user apparatus 100, and user apparatus 100 may calculate the next start position from the end position of the received XOR retransmission group. Further, base station 300 may transmit retransmission data report information regularly, for example, using XOR_POS. XOR_POS is required to be transmitted regularly regardless of whether or not retransmission is necessary, so that a time delay is reduced.

Figure 3:
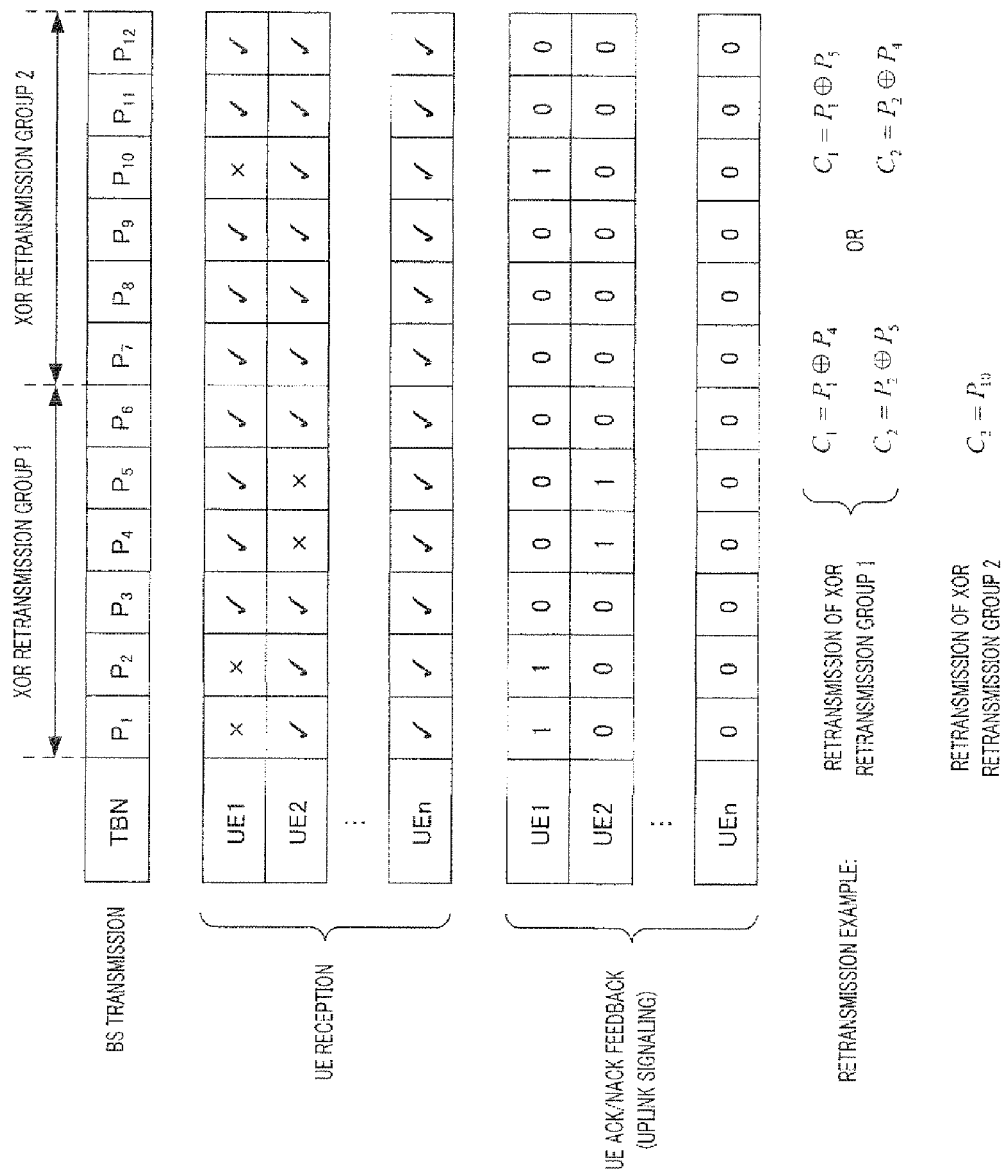
FIG. 3 illustrates a conventional XOR retransmission method.

Here, assume that the number of UEs accepting an MBMS service is fifty and one NACK message and one MNI message occupies one bit resource, and data packets for transmission are from $P_1$ to $P_{12}$. In this case, uplink feedback signaling is as shown in FIG. 15. In FIG. 15, the number of retransmission data packets is the same between a conventional XOR retransmission and the XOR retransmission of the present invention. Specifically, for example, with a conventional XOR retransmission, uplink feedback signaling for the amount of NACK message×the number of data packets×the number of UEs is required as shown in FIG. 3. That is, here, as shown in FIG. 15, 600 bits (=1 bit×12 data packets×50 UEs) are required for signaling. By contrast with this, with the present invention, uplink feedback signaling for the amount of information (i.e. the NACK message+the NMI message)×the number of data packets is required. That is, as shown in FIG. 15, signaling of 24 bits (2(=1+1) bits×12 data packets) may be required.

As shown in FIG. 15, as compared with a conventional XOR retransmission, it is understood that the technical solution means of the above embodiment is able to reduce uplink signaling. Specifically, according to an embodiment of the present invention, the amount of uplink feedback signaling has no relationships with the number of UEs. That is, even when the number of UEs increases, the amount of uplink feedback signaling does not increase.

In this way, according to the present embodiment, by adopting the XOR retransmission method, it is possible to reduce the amount of retransmission data and uplink signaling overhead.

The present invention has been described with preferred embodiment to carry out the present invention. It is obvious to one skilled in the art that various modification, substitution and addition are possible without departing from the spirit and scope of the present invention. Therefore, it should be understood that the scope of the present invention is not limited to the embodiment as specified above and limited by the claims which follow.

The disclosure of Chinese Patent Application No. 200810004614.1, filed on Jan. 21, 2008, including the specification, drawings and abstract, is incorporated herein by reference in its entirety.

Industrial Applicability

The retransmission method, the base station and the user apparatus in the multicast system of the present invention is applicable to mobile communication systems.

The invention claimed is:

1. A retransmission method in a multicast system including a base station and at least one user apparatus, the method comprising:
when the user apparatus has a service quality greater than or equal to a predetermined threshold,
transmitting to the base station a first message showing a data packet with an error detected later as between two errors detected in a plurality of data packets received in the user apparatus;
receiving, from the base station, a retransmission group including one or more data packets, the one or more data packets forming one retransmission data packet obtained by performing exclusive or (XOR) calculation, the retransmission group is formed using consecutive data packets in the plurality of data packets, and a start position and an end position of the one or more data packets being determined based on the first message; and
when the service quality of the user apparatus is lower than the predetermined threshold, disallowing the user apparatus from transmitting the first message showing a data packet with an error detected later as between two errors detected in a plurality of data packets received in the user apparatus having the lower service quality.

2. The retransmission method according to claim 1, wherein the retransmission group is formed such that one or no data packet with an error in each user apparatus is included in the retransmission group.

3. The retransmission method according to claim 2, further comprising transmitting from the user apparatus to the base station a second message showing a packet data with an error detected earlier as between the two errors.

4. The retransmission method according to claim 1, further comprising receiving a third message showing the start position and the end position of the one or more data packets.

5. The retransmission method according to claim 4, wherein the third message is transmitted from the base station regularly.

6. The retransmission method according to claim 1, wherein the retransmission group is transmitted from the base station at a predetermined time after the first message is received at the base station.

7. The retransmission method according to claim 1, wherein the start position is a first data packet shown in the first message and the end position is a second data packet that immediately precedes the first data packet.

8. A base station apparatus in a multicast system comprising:
   a reception section that receives a first message from a user apparatus when the user apparatus has a service quality greater than or equal to a predetermined threshold, the first message showing a data packet with an error detected later as between two errors detected in a plurality of data packets received in at least one user apparatus, the user apparatus being disallowed from transmitting the first message when the user apparatus has a lower service quality than the predetermined threshold; and
   a transmission section that transmits a retransmission group including one or more data packets, the one or more data packets forming one retransmission data packet obtained by performing exclusive or (XOR) calculation, the retransmission group is formed using consecutive data packets in the plurality of data packets, and a start position and an end position of the one or more data packets being determined based on the first message.

9. The base station apparatus according to claim 8, further comprising a determination section that determines the start position and the end position of the one or more data packets based on the first message, and that forms the retransmission group including the one or more data packets based on the start position and the end position of the one or more data packets.

10. The base station apparatus according to claim 8, wherein the retransmission group is formed such that one or no data packets with an error in each user apparatus is included in the retransmission group.

11. The base station apparatus according to claim 8, wherein the transmission section transmits to the user apparatus a third message showing the start position and the end position of the one or more data packets included in the retransmission group.

12. The base station apparatus according to claim 8, wherein the transmission section transmits the retransmission group at a predetermined time after the first message is received.

13. A user apparatus in a multicast system, comprising:
   a reception section that receives a plurality of data packets;
   a detection section that detects an error in the plurality of data packets;
   a count section that counts the number of errors detected in the plurality of data packets;
   a generation section that generates a first message showing a data packet with an error detected later as between two errors when the number of errors counted is two; and
   a transmitting section that transmits the first message when the user apparatus has a service quality greater than or equal to a predetermined threshold and is disallowed from transmitting the first message when the user apparatus has a lower service quality than the predetermined threshold,
   wherein the reception section further receives a retransmission group including one or more data packets, the one or more data packets forming one retransmission data packet obtained by performing exclusive or (XOR) calculation, the retransmission group is formed using consecutive data packets in the plurality of data packets, and a start position and an end position of the one or more data packets being determined based on the first message.

14. The user apparatus according to claim 13, wherein the transmitting section transmits a second message showing a data packet with an error detected earlier as between the two errors.

15. The user apparatus according to claim 13, wherein the retransmission group is formed such that one or no data packet with an error in each user apparatus is included in the retransmission group.

* * * * *